Figure 1:
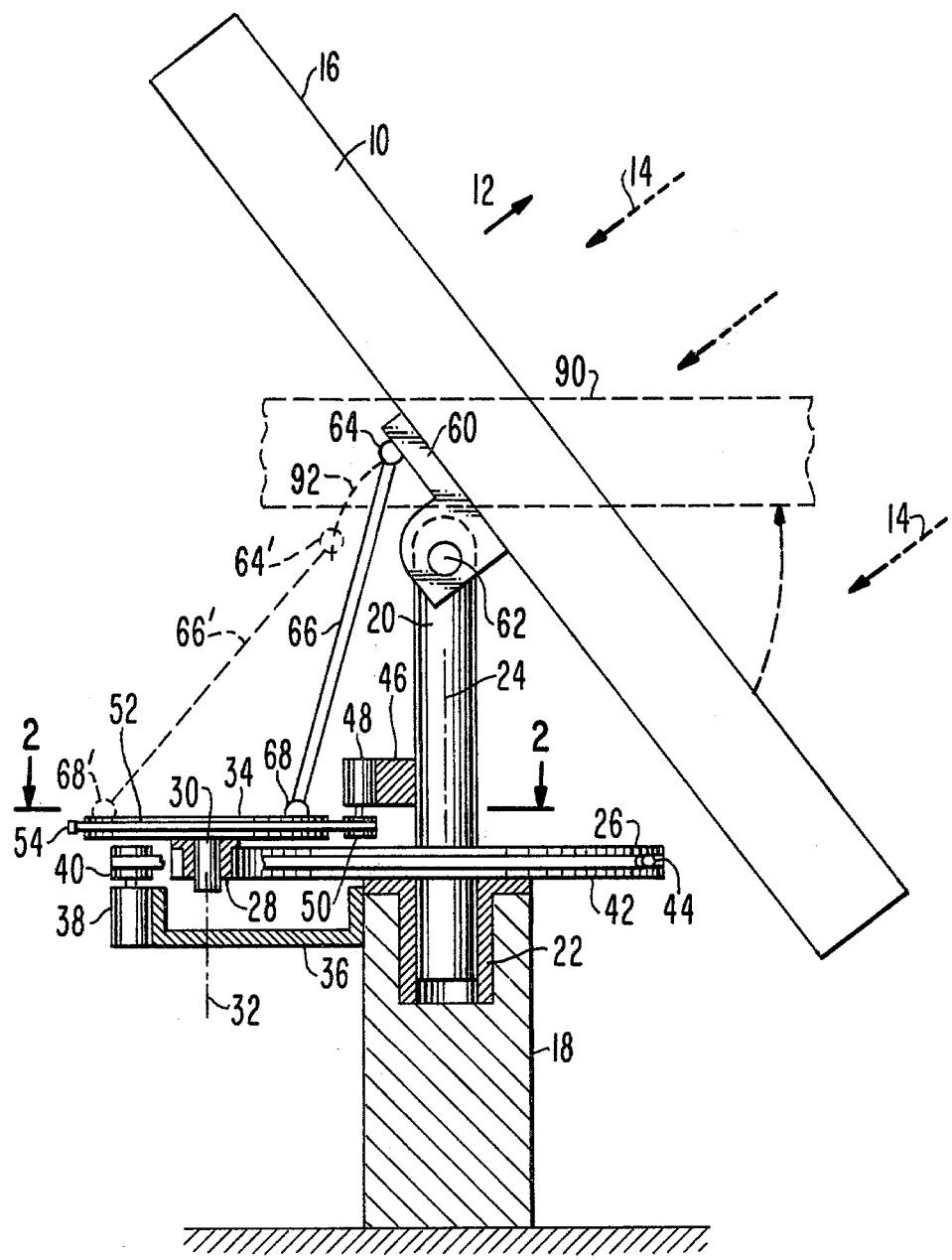

United States Patent [19]

Siryj

[11] 4,295,621

[45] Oct. 20, 1981

[54] SOLAR TRACKING APPARATUS
[75] Inventor: Bohdan W. Siryj, Cinnaminson, N.J.
[73] Assignee: RCA Corporation, New York, N.Y.
[21] Appl. No.: 131,517
[22] Filed: Mar. 18, 1980
[51] Int. Cl.³ .................... F16M 11/12; G02B 21/24
[52] U.S. Cl. .......................... 248/183; 74/42; 74/96; 126/425; 248/1; 343/882; 343/765; 350/83; 353/3
[58] Field of Search ............... 74/96; 126/424, 425; 350/289, 83; 353/3; 250/203 R, 491; 248/1, 179, 183; 343/880, 882, 765, 766; 434/291–294

[56] References Cited

U.S. PATENT DOCUMENTS

| | | | |
|---|---|---|---|
| 141,037 | 7/1873 | Cross | 74/96 |
| 497,079 | 5/1893 | Severy | 126/424 |
| 2,541,030 | 2/1951 | Busignies | 343/766 |
| 2,642,567 | 6/1953 | Kimball et al. | 343/765 |
| 2,960,693 | 11/1960 | Fry | 343/882 |
| 3,070,699 | 12/1962 | Lehmann et al. | 250/203 R |
| 3,604,009 | 9/1971 | Behnke | 343/766 |
| 3,788,734 | 1/1974 | McDuffee | 350/289 |
| 3,998,206 | 12/1976 | Jahn | 126/271 |
| 4,013,885 | 3/1977 | Blitz | 250/203 R |
| 4,031,385 | 6/1977 | Zerlaut | 250/203 R |
| 4,063,543 | 12/1977 | Hedger | 126/270 |

FOREIGN PATENT DOCUMENTS 582257 11/1946 United Kingdom .

*Primary Examiner*—Lawrence J. Staab
*Attorney, Agent, or Firm*—Samuel Cohen; William Squire

[57] ABSTRACT

A solar array support member is pivotally secured to the upper end of a support post for rotation about a horizontal axis. The support post is driven about a vertical axis. A disc is rotatably secured to the post for rotation about a vertical axis spaced from the post's vertical axis. A link member is secured by respective ball and socket assemblies at one end to the support member and to the rotating disc at the other end. A motor and pulley system drive the rotating disc with respect to the vertical post to set the elevation position of the support member. A second motor and pulley system drive the post about its vertical axis with respect to a base.

1 Claim, 2 Drawing Figures

SOLAR TRACKING APPARATUS

The present invention relates to solar tracking apparatus.

Solar tracking apparatus includes mechanisms for orienting a device, whether it be solar cells or other energy conversion systems, to face the sun during diurnal and seasonal cycles. This requires the conversion devices to be pivoted about at least two axes. One axis permits the tracking device to follow the sun from the east to west path in the sky while the other axis permits the tracking device to follow the sun in its variations in elevation above the horizon when traversing the east-west path. Many different kinds of apparatus have been developed over the years for accomplishing these movements. However, these apparatus usually are complex, bulky and can also be costly.

In accordance with an embodiment of the present invention, in a solar tracking apparatus the combination comprises a base and a four bar linkage, one link of the linkage being of fixed length and rotatably secured vertical to the base for rotation about a fixed vertical axis. A second link of fixed length includes means for securing thereto a device to be aimed at the sun and is rotatably secured to the one link for rotation about a horizontal axis. A third link of fixed length is pivotally secured to the second link and to a fourth link. The fourth link has a variable length connected between the first and third links. Means are connected to the base for rotating the one link about the vertical axis. Means are provided for varying the length of the fourth link to thereby pivot the second link about the horizontal axis.

Figure 2:
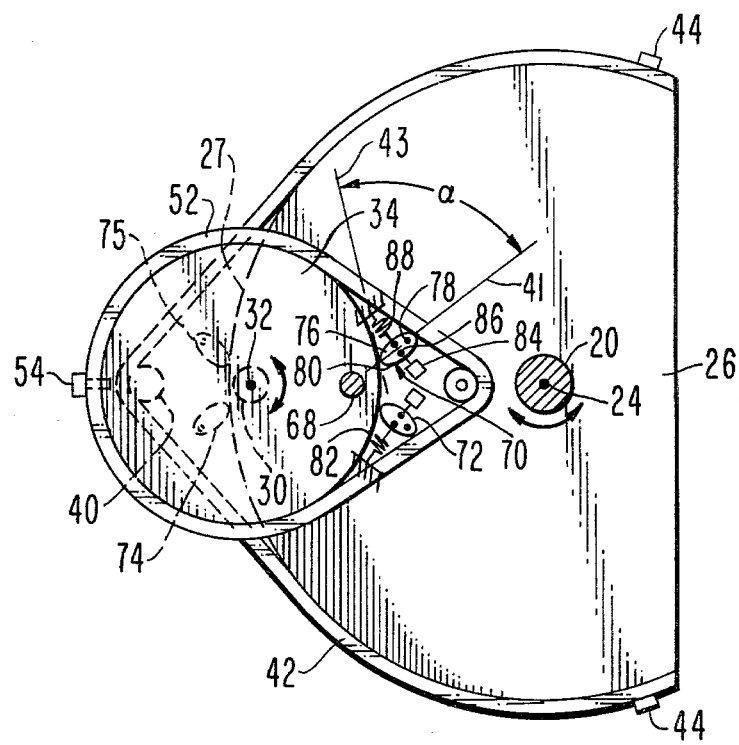

In the drawing:

FIG. 1 is an elevation partial sectional view of an apparatus embodying the present invention, and FIG. 2 is a plan view taken along lines 2—2 of FIG. 1.

In FIG. 1 a solar array 10 faces in direction 12 to receive incident energy 14 from the sun. The front face 16 of the array 10 in a tracking mode must always be perpendicular to the energy 14. The mechanism to be described accomplishes this purpose.

Base 18, mounted in the ground, rotatably secures post 20 via bearings 22 for rotation about a vertical axis 24.

As seen in FIG. 2, the post 20 has secured thereto a horizontally oriented partial disc member 26. Disc member 26 has a bearing 28, FIG. 1, to which is mounted shaft 30. Shaft 30 rotates about vertical axis 32 parallel to axis 24 and spaced from axis 24, FIG. 2.

Secured to the upper end of shaft 30, FIG. 1, is a circular disc 34, which is mounted horizontally. Secured to base 18 is a support bracket 36 to which is mounted a drive motor 38. Drive motor rotates a pulley 40. A drive belt 42 is screwed to the member 26 by screws 44. The belt 42 has teeth (not shown) for providing accurate timing relationship between the pulley 40 and member 26.

A support bracket 46 secures motor 48 to post 20. Motor 48 drives pulley 50. Pulley 50 rotates timing belt 52 which is a toothed belt which may be fixed to the disc 34 by screw 54. The screw 54 is optional as are the screws 44. Screws 44 assume that the rotation of the member 26 will be no greater than 240° or ±120°. Screw 54 is based on the assumption that the disc 34 will not be rotated more than 180°. Depending on the latitude in which the tracking apparatus is located, it may be possible that these angles could be somewhat greater. In this case, screws 54 and 44 are removed. In the case of the screws 44 the partial disc member 26 is made into a full circular disc and the belt 42 is made endless so it surrounds such a circular disc. In any case, the teeth on the belts 52 and 42 mate with teeth on the corresponding discs and drive pulleys to prevent slippage. Motors 38 and 48 receive drive signals from a suitable tracking control system as known in the art. Such tracking control systems are in widespread use and need not be described herein.

Such control systems can include, for example, a quad arrangement of photovoltaic cells to provide an azimuth control signal for driving the motor 38 and an elevation control signal for driving motor 48. The quad cells are oppositely disposed pairs of photoelectric cells which produce an unbalanced signal when the array is not normal to the sun's energy 14, i.e., the array's front 16 does not face in the direction of the sun's rays. The unbalanced signal causes the generation of a servo-control signal for driving one of the motors 38 and 48 in the direction to correct the unbalance. These type of servo-control systems are well known.

Solar array 10 is mounted to pivot member 60 which rotates about a horizontal axis 62 at the upper end of post 20. Secured to the pivot member 60 is a ball and socket assembly 64 spaced from the axis 62. Link 66 is connected to the ball and socket assembly 64 at one end and to a ball and socket assembly 68 at the other end secured to the upper surface of disc 34 at a point spaced from the vertical axis 32.

As a result of this configuration the entire weight produced by the solar array 10 is transmitted to the base 18 via the post 20. The relatively smaller torque and wind loads about the axis 62 are transmitted through link 66.

In FIG. 1, the structure for moving the array 10 comprises a four bar linkage in which one bar has a variable, controlled length. The four bars are as follows. One link of fixed length comprises post 20 which is rotatably secured about fixed vertical axis 24. This link has a length extending between the pivot axis 62 and the intersection of axis 24 with a horizontal line through the pivot center of socket assembly 68. A second link of fixed length comprises pivot member 60. Its length is the distance between axis 62 and the pivot center of socket assembly 64. Link 66 forms the third link, and has a length between the pivot centers of socket assemblies 64 and 68. The fourth link of variable length is the mechanism coupling the socket assembly 68 to post 20. This link includes disc 34, shaft 30, bearing 28 and disc member 26. This link has a variable length determined by the horizontal distance between the pivot center of socket assembly 68 and axis 24. This distance has a minimum value when socket assembly 68 is positioned as shown solid and a maximum value when assembly 68 is positioned as shown dashed at 68'.

In FIG. 2, to prevent rotation of the disc 34 and member 26 due to windloads, four one-way clutch assemblies 70, 72, and 74, 75, respectively, are provided. These assemblies are identical in structure and therefore only one need be described in detail. One-way clutch assembly 70 comprises an elongated arm 76 pivoted at 78 at one end to the upper surface of disc member 26. Extended end surface 80 of arm 76 makes friction contact with the surface of edge 82 of disc 34. A solenoid 84 secured to member 26 is connected to the arm 76 by piston 86. A spring 88 secured at one end to the member 26 and at the other end to the arm 76 resiliently holds the arm 76 surface 80 against the edge 82 in friction engagement therewith.

The arm 76 is an elongated member having a curved end surface 80 in contact with edge surface 82 of disc 34. The elongated axis 41 of the arm 76 is at an acute angle α with a tangent 43 to edge surface 82 normal to a radial line through the center of the disc 34 at axis 32. When the disc 34 rotates in a clockwise direction about axis 32, FIG. 2, the disc edge surface 82 slides with respect to the surface 80 of arm 76. However, when the disc 34 rotates in the counter-clockwise direction because of the arm 76 angle α, the arm tends to form a one-way clutch and jam against the edge 82 of the disc 34. This tends to prevent rotation of the disc 34 in the counter-clockwise direction. One-way clutch 72 is identical in structure as clutch 70 except it is facing in a direction 90° from that of the clutch 70, so that it prevents the disc 34 from rotating in a clockwise direction. One-way clutches 74 and 75, secured to bracket 36, are identical in structure as the clutch 70 and are also at 90° with respect to each other and engage the outer edge 27 of the member 26 to provide one-way clutch action with respect to this member. A suitable control (not shown) actuates the solenoids of the one-way clutches 70, 72, 74 and 75 to disengage the respective arms thereof out of friction engagement with the corresponding disc edges to permit rotation of the discs in the proper direction. This is accomplished by retracting the solenoid piston 86.

In operation, motors 48 and 38 and solenoids 84 are connected to a source of tracking signals which indicate mis-aiming of the array 10 from the solar energy 14. In accordance with the direction manifested by those control signals the motors 48 and 38 and solenoids 84 are caused to operate in the appropriate direction. Assuming for the moment that the sun's rays are directly overhead and that the array 10 should be oriented as shown dashed at 90, FIG. 1, then a control signal is supplied to the motor 48 to rotate the disc 34 and to the solenoid 84 of clutch 70 to retract arm 76 out of contact with surface 82. Activation of the solenoid 70, FIG. 2, permits rotation of the disc 34 in a counter-clockwise direction about axis 32. In this direction the arm 76 of one-way clutch 72 slips with respect to edge surface 82 of the disc 34. The disc 34 is rotated until the ball and socket assembly 68 connecting the link 66 to disc 34 is in the position indicated by the dashed ball and socket assembly 68', FIG. 1. In this position, the link 66 is oriented as shown by the dashed line 66'. As shown by the dashed curve 92, FIG. 1, the ball and socket assembly 64 moves to the position shown dashed 64', thus orienting the array 10 to the dashed line position 90.

The rotation of the disc 34 anywhere from the initial position to that 180° from the illustrated position, as shown by the dashed lines 64', 66' and 68', in FIG. 1, the array 10 will assume any one of a variable elevation pointing controlled position from that shown in solid line in FIG. 1 to that shown in dashed line. The solid line position, therefore, is that elevation position at which the sun is at its lowest desired tracking height during a tracking mode, while that shown by the dashed position 90 represents the maximum or highest point in the sky of the sun. Normally the sun is about 10° about the horizon before the tracking commences.

A control signal applied to motor 38 rotates the belt 42 which rotates the post 20 about the axis 24. This permits the array 10 to follow the sun in its east-west traverse across the sky. Therefore, any combination of the positions of the post 20 about its axis 24 and the disc 34 about its axis 32 can position the array 10 to any pointing orientation within the field of the sky in which the sun is expected to be tracked.

When the array 10 is positioned with its face 16 normal to the sun's energy 14, the tracking photovoltaic cells (not shown) generate a signal representing an equilibrium condition. This equilibrium condition signal releases the pistons of solenoids 84 of the one-way clutches 70, 72, 74 and 76 of FIG. 2, so that the corresponding springs 88 resiliently urge the arms 76 against the edge surface 82 of the disc 34, or edge surface of the lower disc member 26 as the case may be.

What is claimed is:

1. In a solar tracking apparatus the combination comprising:
   a base;
   a support member, rotatably secured to the base for rotation about a first vertical axis;
   means for rotating said support member about said first vertical axis, said means including a first horizontal pulley secured to the support member, and pulley drive means secured to the base and pulley for rotating the pulley with respect to the base;
   a pivot member rotatably secured to said support member for rotation about a horizontal axis;
   elevation drive means for rotating said pivot member about said horizontal axis, said elevation drive means including a second horizontal pulley rotatably secured to the first pulley for rotation about a second vertical axis, and means secured to the support member for rotatably driving said second pulley about said second axis; and
   a link member pivotally secured to said second pulley at a point spaced from the second vertical axis and to said pivot member at a point spaced from said horizontal axis.

* * * * *